United States Patent Office 3,769,400
Patented Oct. 30, 1973

3,769,400
PROCESS FOR THE MANUFACTURE OF A LIVE VACCINE AGAINST THE INFECTIOUS BURSITIS OF CHICKENS

Hans-Joachim Bengelsdorff, Marbach, near Marburg an der Lahn, Germany, assignor to Behringwerke Aktiengesellschaft, Marburg an der Lahn, Germany No Drawing. Filed Sept. 10, 1971, Ser. No. 179,539
Claims priority, application Germany, Sept. 12, 1970, P 20 45 160.9
Int. Cl. C12k *5/00, 7/00*
U.S. Cl. 424—89 6 Claims

ABSTRACT OF THE DISCLOSURE

Preparation of a live vaccine against infectious bursitis of chickens by adapting the virus to baby mice by about 18 to 25 passages in the presence of an immuno-suppressive agent and a vaccine prepared by this method.

The present invention relates to a process for the manufacture of a live vaccine against the infectious bursitis of chickens (Gumboro disease) and to a vaccine prepared thereby.

Infectious bursitis is a chicken disease spread all over the world which affects especially young animals of an age from 2 to 6 weeks. The animals suffer from diarrhea, show bleeding of the muscular system and bloody necrotizing inflammations of the bursa fabricii, an appendix organ of the rectum. They either die or show retarded growth and insufficient fodder utilization. The economical damage is particularly great in the production of broilers.

At least one attempt has already been made to prepare a vaccine against infectious bursitis by passages in embryonated chicken eggs. This was found in at least one instance to be difficult, because the bursitis virus often would not proliferate in the egg culture after 3–4 passages. Where in individual cases passaging could be carried out, the virus titer was low and the virus suspension was deemed to be unsuitable for the manufacture of a vaccine. However, U.S. Pat. 3,548,055 granted Dec. 15, 1970 does describe that an egg-propagated vaccine for infectious bursitis can in fact be made by inoculating the causative virus, which has been isolated from the bursa of Fabricius, liver, kidneys, and other organs of infected birds, into embryonating eggs on the sixth to tenth day of incubation, inoculating an extract from the embryos dying on the third to sixth day following initial inoculation into six to ten-day embryonating eggs and repeating the cultivation procedure for at least eight times until the virulence of the causative virus is diminished, inoculating an extract from the embryos containing the virus of diminished virulence into six to ten-day embryonating eggs, and blending the embryos dying on the third to sixth day following the final inoculation with an aqueous solution followed by filtration to remove coarse particles. The patent further describes a method wherein the embryonating eggs are initially inoculated with an aqueous extract of an organ of a bird infected with infectious bursal disease.

The present invention provides a process for the manufacture of a live vaccine against the infectious bursitis of chickens, wherein the infectious bursitis virus is adapted to baby mice by about 18 to 25 serial passages with the use of immuno-suppressive agents (and is thereby simultaneously attenuated). The attenuated virus is then extracted and worked up in known manner to give a vaccine.

Baby mice of the white mouse or of Mastomys natalensis of an age from 1–3 days are preferably used and the infected baby mice are killed in moribund condition for the extraction or they are worked up immediately after their death.

The infectious bursitis virus is suitably isolated from the bursa fabricii of chickens affected with bursitis, by homogenizing the bursa and centrifugating the homogenized product. The virus-containing suspension obtained is then injected intraperitoneally into baby mice. It is also possible to intercalate one or several egg passages. The 1–3 days old baby mice each obtain an application dose of about 0.05 ml. of the virus suspension, the virus concentration of which is at least $10^2$ egg-$ID_{50}$/ml. 1 egg-$ID_{50}$ is defined as the virus concentration which kills 50% of the infected chicken embryos or brings about a virus-specific modification. A mouse-$ID_{50}$ is defined accordingly.

After the infection, the baby mice receive subcutaneous injections of an immuno-suppresive agent. Thereby the defensive strength of the animals is lowered and the clinical phenomena of the infection are promoted. Suitable immuno-suppresive agents are, for example, corticosteroids such as cortisone, hydrocortisone, prednisone, prednisolone, 6-methyl-prednisolone, dexamethasone and paramethasone, and their therapeutically utilizable esters; furthermore anti-metabolites such as 6-mercaptopurine; alkylating agents such as cyclophosphamide; and, possibly, antilymphocytic serum and anti-lymphocytic globulin. Depending on the substance used, the dosage is in the range of from 50 to 500$\gamma$ per baby mouse. If corticosteroids are used, the dose used is, for example, 100–200$\gamma$ mouse.

After some days, the infected animals show paralytic symptoms. In this phase the animals are killed and homogenized with physiological salt solution to a 10–20% extract. In order to precipitate accompanying proteins, the extract is shaken with a suitable precipitating agent, for example a halohydrocarbon such as chloroform, for about 1 hour and then stored for about 18–24 hours at about +4° C. The precipitated accomapnying proteins are then removed by centrifugation. The virus-containing supernatant is then used for the following mouse passage.

The time between the infection and the appearance of the paralytic symptoms is shortened with increasing number of passages from initially 8 to about 4–6 days. Although a further shortening cannot be obtained even by continuation of the passages, the virus is completely adapted to baby mice. After about 18–25 mouse passages, the infectious bursitis virus is attenuated for chickens of any age.

The immuno-suppressive preparation is injected into the animals until about the 10th to 12th mouse passage. An application of immuno-suppressive agents is then no longer necessary.

For preparing the vaccine, the mouse extract, which has been freed from accompanying proteins, is combined with a protective colloid, for example with skimmed milk or with an infusion solution prepared according to German Patent 1,118,792 (known under the trademark "Haemaccel®" which contains a gelatine derivative. The concentration of the protective colloids varies according to the substance used and is preferably in the range from 1.0 to 5.0%. The virus suspension containing the protective colloid is then lyophilized. Per inocculation dose, the dry vaccine contains $10^{3.5}$ to $10^{6.5}$ mouse $ID_{50}$ infectious bursitis virus. For immunizing the chickens, it is dissolved in drinking water. In order to reach a faster up-take of drinking water, it is suitable to leave the chickens without water for one or two hours prior to vaccination.

The following examples illustrate the invention:

EXAMPLE 1

A homogeneous product was prepared from the bursa fabricii of chickens affected specifically with bursitis and embryonated chicken eggs were inoculated with this product. One chicken egg, the embryo of which had died on the 4th day after the infection, was opened, the embryo was withdrawn with the allantoamnionic liquid surrounding it, homogenized and extracted with physiological salt solution. The extract was shaken for 1 hour with 10% by volume of chloroform and then centrifuged for 5 minutes at 3000 rev./min. The virus-containing supernatant liquid was then injected intraperitoneally in doses of 0.05 ml. into two day old baby mice (1st baby mouse passage). The virus titer per 0.05 ml. was $10^{2.5}$ egg-$ID_{50}$. After the virus infection, the baby mice each were given subcutaneous injections of 100 prednisolone-hemisuccinate (Na-salt). 8 days after the infection of the animals, the first distinct paralytic symptoms and conditions of disequilibrium appeared. Thereupon, the baby mice were killed for the 2nd baby mouse passage and homogenized with physiological salt solution to give a 10% extract. The extract was shaken for 1 hour with 10% by volume of chloroform and centrifuged for 5 minutes at 3000 rev./min. For the second baby mouse passage, 1 day old baby mice were used which after the infection each also received subcutaneous injections of 100λ of prednisolone-hemisuccinate (Na—salt). After the appearance of distinct paralytic symptoms, the baby mice were killed and the virus was extracted, as described for the first baby mouse passage, for the third baby mouse passage. The passages were continued until the 12th baby mouse passage. The 13th baby mouse passage was effected on 1 day old baby mice for the first time without following injection of corticosteroid. The first specific symptoms of the disease appeared on the 4th day after the infection. Working up of the killed baby mice, the virus extraction and continuation of the mice passage was carried out in the above-described manner.

10 two day old baby mice were infected intraperitoneally with 0.05 ml. each of the 20th baby mouse passage of the infectious bursitis virus and killed after 5 days on the climax of the paralytic phase and homogenized with physiological salt solution to give a 20% extract. The extract was shaken for 1 hour with 10% by volume of chloroform and after being allowed to stand for 18 hours at +4° C. it was centrifuged for 5 minutes at 3000 rev./ml. of the virus-containing supernatant were mixed with 50 ml. of "Haemaccel ®," filled in flasks in portions of 5 ml. and freeze-dried. The virus titer of the dry vaccine after re-suspension and dilution to the orifiinal volume was $10^{7.1}$ baby mouse-$ID_{50}$/ml.

EXAMPLE 2

The innocuousness and efficiency of the infectious bursitis vaccine obtained according to the invention was proved in two experiments with 8 and 12 days old chicks. The chicks were free from specific germs that are pathogenic to chickens and from their antibodies (SPF-chicks).

In the first test, 75 SPF-chicks having an age of 8 days were each immunized by way of their drinking water with $10^{5.6}$ baby mouse-$ID_{50}$ of bursitis virus of the 20th baby mouse passage. Clinically recognizable vaccination reactions did not appear. Two weeks after the immunization, the mean protective index, determined by virus neutralization tests, was $10^{2.1}$ in the serum of the inoculated animals, which had been diluted at a rate of 1:10.

In the virus neutralization test, the antibody concentration in the serum is determined by neutralizing the antibodies with decreasing virus concentrations and is then tested on non-neutralized virus in the baby mouse. The 50%-terminal point is determined according to conventional statistical calculation methods. The serum protective index is the quotient of the virus titer of the test control and the virus titer of the virus antiserum mixture, for example, $$\text{serum protective index} = \frac{10^{-6.5}/0.05 \text{ ml.}}{10^{-4.4}/0.05 \text{ ml.}} = 10^{2.1}$$

Until the 8th week after the inoculation, the serum protective index rose to $10^{3.2}$ and then fell until the 16th week after the inoculation to $10^{2.0}$. Since SPF-chicks before the vaccination have a serum protective index against bursitis virus of almost $10^0$, a high antibody development, which indicated a good protection against infection, could be proved for at least 16 weeks after the inoculation.

In the second test, 80 SPF-chicks having an age of 12 days were each immunized via their drinking water with $10^{5.8}$ baby mouse $ID_{50}$ bursitis virus of the 25th baby mouse passage Clinical vaccination reactions did not appear with these vaccinated animals. The serum protective index of the vaccinated chicks (serum diluted 1:10) was $10^{3.4}$ two weeks after the immunization and $10^{2.8}$ 4 weeks after the vaccination Both serum protective index determinations indicated a good development of antibodies and thus a good protection against infections Both tests also showed that the vaccines prepared according to the invention are effective and innocuous

EXAMPLE 3

Starting from the 63rd egg passage of an infectious bursitis virus prepared according to conventional methods, the virus content of the 67th–73rd egg passage was compared with the virus content of the 16th–22nd baby mouse passage. The egg passages were carried out by inoculation of the allantoic cavity of chicken eggs which had been incubated for 6 days. The embryos which died on the 3rd–6th day after the inoculation were homogenized with the allantoic liquid surrounding them. The embryonal extract was centrifuged for 5 minutes at 3000 rev./min., the virus-containing supernatant liquid serving each time as infection material for the following passage. The virus content was determined by dilution of the supernatant liquid by powers of ten and inoculation into chickens' eggs that had been incubated for 6 days. The inoculation dose per egg was 0.1 ml. The embryos which died between the 2nd and the 12th day after the infection, and all surviving embryos which showed virus-specific modifications were used for the determination of the virus titer according to a statistical calculation method.

The baby mouse passages were effected in accordance with the method described in Example 1, but without using a corticosteroid. For the virus titrations, the virus dilutions were injected intraperitoneally into 1–2 day old baby mice. The baby mice which fell sick with paralytic symptoms within 21 days after the infection were evaluated as virus infected.

The following table indicates the virus titers per ml. of the undiluted embryonic extract and of the 20% baby mouse extract.

| Egg passage | Virus titer/ml. of undiluted embryonic extract | Mouse passage | Virus titer/ml. of a 20% baby-extract |
|---|---|---|---|
| 67 | $10^{-4.0}$ | 16 | $10^{-6.9}$ |
| 68 | $10^{-4.5}$ | 17 | $10^{-5.8}$ |
| 69 | $10^{-4.8}$ | 18 | $10^{-5.1}$ |
| 70 | $10^{-5.0}$ | 19 | $10^{-6.5}$ |
| 71 | $10^{-5.3}$ | 20 | $10^{-7.1}$ |
| 72 | $10^{-5.5}$ | 21 | $10^{-6.9}$ |
| 73 | $10^{-5.3}$ | 22 | $10^{-7.5}$ |

These figures show that the baby mouse extracts diluted to a strength of 20% contain more virus, by one to two powers of ten, than do the undiluted chicken embryonal extracts.

We claim:

1. A process for the manufacture of a live vaccine against the infectious bursitis of chickens, which process comprises adapting the infectious bursitis virus, isolated from organs, particularly the bursa fabricii appendix of the rectum, of chickens affected with bursitis, to baby mice intra-peritoneally injected therewith by about 18 to 25 serial passages, with the administration of an effective amount of an immuno-suppressive agent selected from the group consisting of corticosteroids, anti-metabolites, and alkylating agents, said immuno-suppressive agent being subcutaneously injected into the baby mice after the intra-peritoneal bursitis infection to lower the defensive strength of the animals and to promote the clinical phenomena of the infection, said virus being thereby simultaneously attenuated; extracting the attenuated virus from infected dead mice; and then lyophilizing the mouse extract, freed from accompanying proteins, together with a protective colloid.

2. A process as in claim 1 wherein said dead mice are mice killed after showing paralytic symptoms.

3. A process as defined in claim 1, wherein 1-3 day old baby mice of white mouse or of *Mastomys natalensis* are used.

4. A process as defined in claim 1, wherein corticosteroids are used as the immuno-suppressive agent.

5. A process as defined in claim 1, wherein prednisolone or the medicinally utilizable esters thereof are used as the immuno-suppressive agent.

6. A live vaccine against infectious bursitis of chickens prepared according to claim 1.

References Cited

UNITED STATES PATENTS 3,548,055   12/1970   Moulthrop _____ 424—89

SHEP K. ROSE, Primary Examiner

U.S. Cl. X.R.

115—1 3